Dec. 25, 1934.    C. W. WEISS    1,985,753
MILLING MACHINE
Filed Nov. 23, 1933    3 Sheets-Sheet 1

Dec. 25, 1934.  C. W. WEISS  1,985,753
MILLING MACHINE
Filed Nov. 23, 1933  3 Sheets-Sheet 2
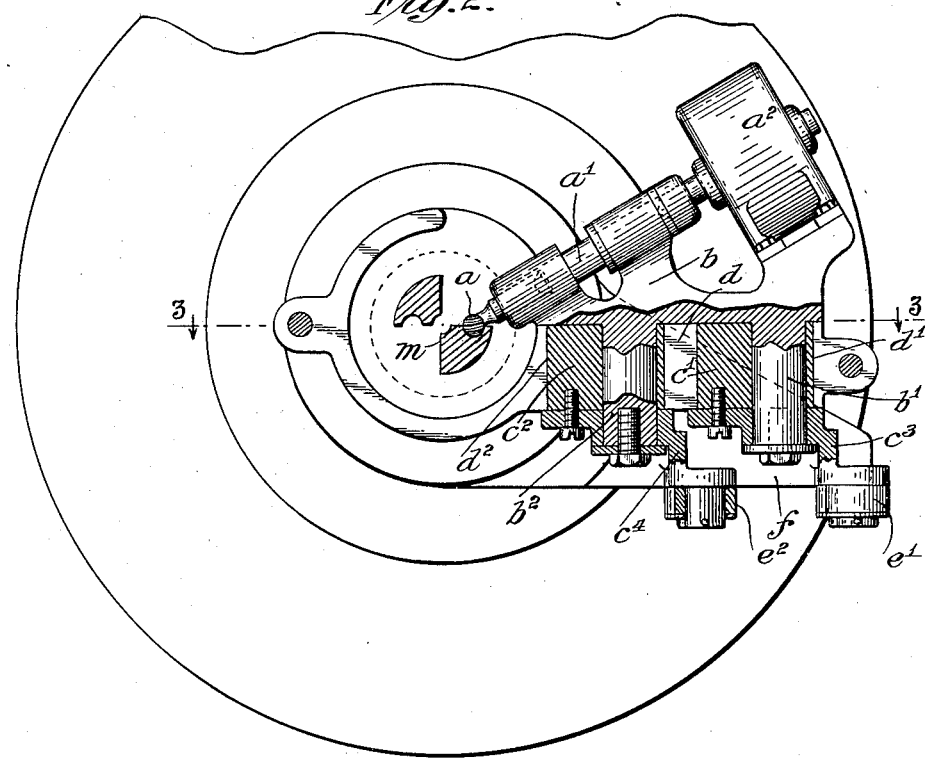
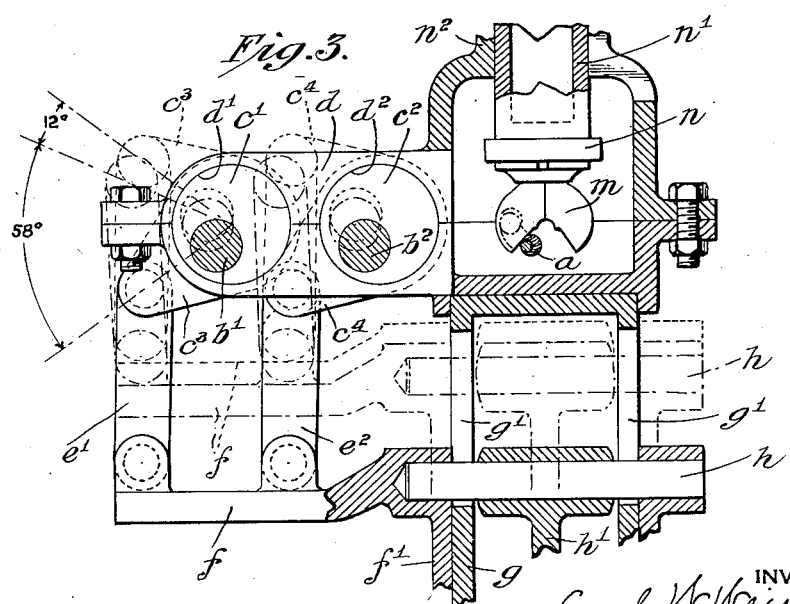

Dec. 25, 1934.   C. W. WEISS   1,985,753
MILLING MACHINE
Filed Nov. 23, 1933   3 Sheets-Sheet 3

Patented Dec. 25, 1934

1,985,753

UNITED STATES PATENT OFFICE 1,985,753

MILLING MACHINE

Carl W. Weiss, Brooklyn, N. Y.

Application November 23, 1933, Serial No. 699,305

6 Claims. (Cl. 90—15)

In Letters Patent of the United States No. 1,522,351, granted upon the application of the present applicant, there is shown and described a universal joint in which the proximate faces of the coacting portions of the two members are formed with intersecting non-concentric grooves in which is received a relatively movable ball. In the joint illustrated the grooves are shown as curved and in the practical embodiment of that form of the invention the milling of the curved grooves has been hitherto a factor of some importance in the construction of such universal joints. The present invention has been developed in the effort to facilitate the milling of such curved grooves or races and thereby to facilitate and reduce the expense of production of such universal joints. While the invention has been developed with this particular application in view, it will nevertheless be understood that this invention is capable of application to other uses and is not restricted to the production of universal joints. In accordance with the invention the milling cutter, while rotated on its own axis, is so supported and controlled in its movements as to be capable of forming a groove or race of a prescribed form or curvature.

The invention will be more fully explained hereinafter with reference to the accompanying drawings in which it is illustrated, and in which:

Figure 2 is a view in plan and horizontal section on the plane indicated by the broken line 2—2 of Figure 1.

Figure 3 is a detail view in vertical section on the plane indicated by the broken line 3—3 of Figure 2.

Figure 1:
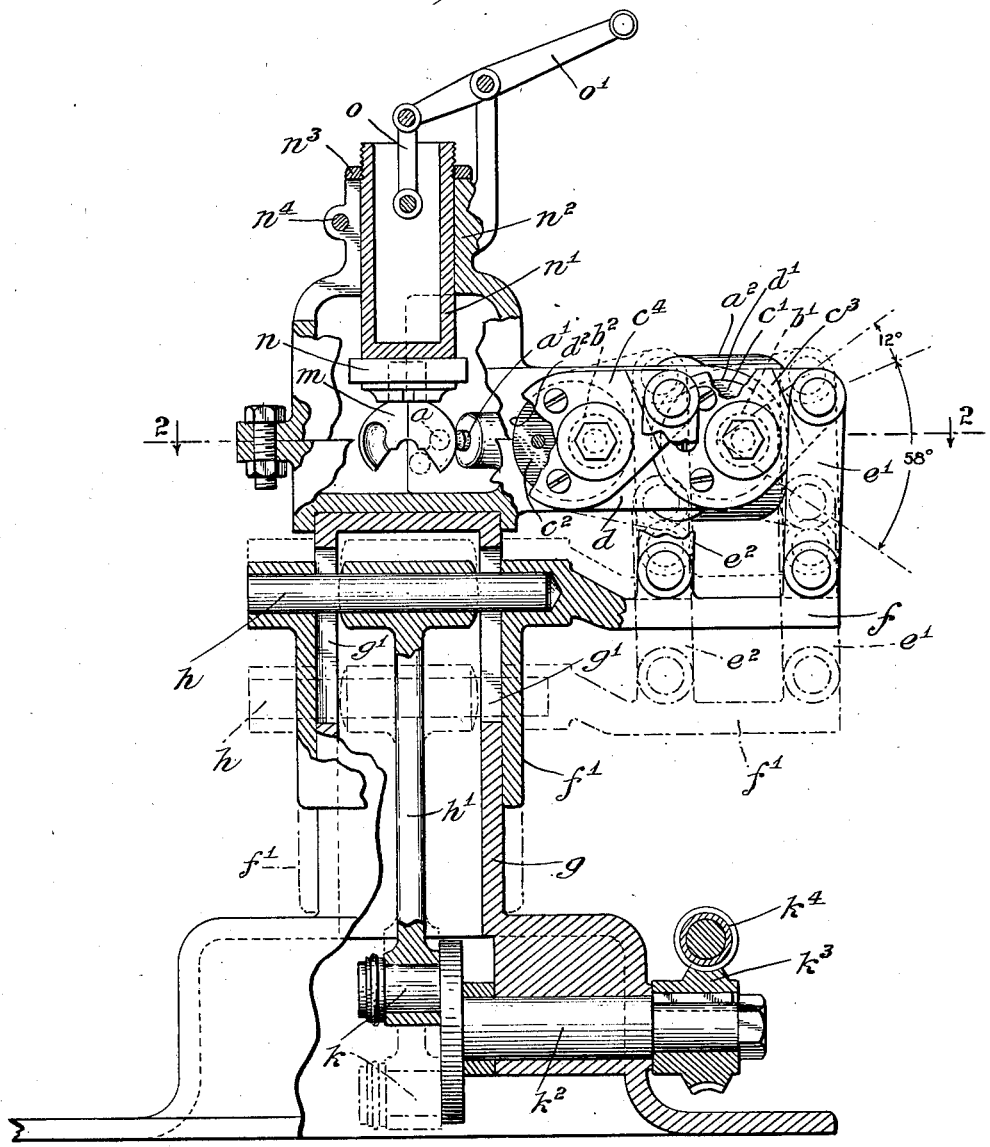
Figure 1 is a view in vertical, sectional elevation of a milling machine which embodies the invention, the machine shown in this figure being equipped with a single milling cutter.
Figure 4:
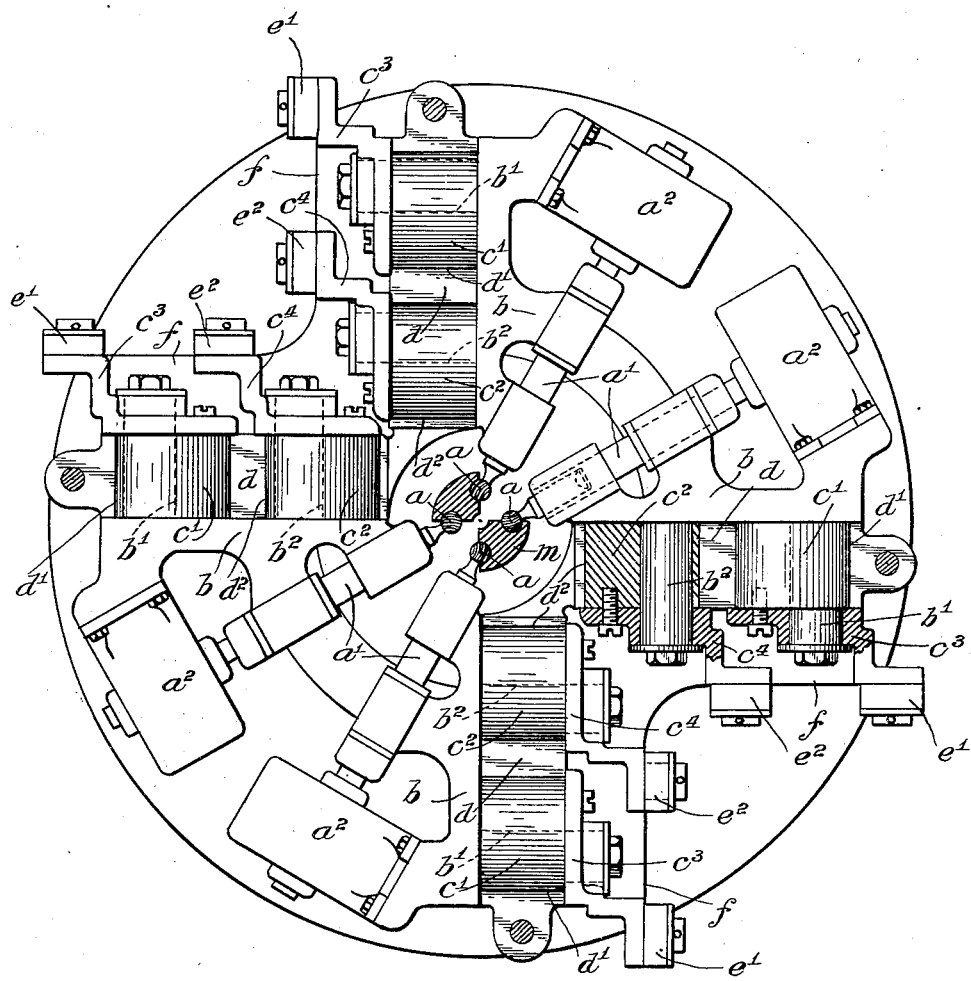
Figure 4 is a sectional plan view of a four-spindle milling machine, the plane of section being that indicated by the broken line 2—2 of Figure 1.

The milling cutter $a$, which may be of any suitable shape, is shown as carried on the end of a spindle $a^1$ which may be rotated on its own axis by any suitable means, preferably by a motor $a^2$ applied directly to the spindle. The spindle is shown as mounted in suitable bearings in a carrier $b$ which is supported and actuated so as to have a movement of oscillation in a plane which, in the embodiment of the invention shown in the drawings and adapted for use in the construction of universal joints, includes the axis of the part operated upon which, in the instance assumed, is one member of a universal joint. The milling cutter $a$, carried by and forming a part of the spindle has imparted to it thereby a movement in a curved path which, in the embodiment of the invention illustrated, is the arc of a circle and, being rotated on its own axis, cuts in the face of the work, that is, the member of a universal joint, the curved groove or race described in said Letters Patent No. 1,552,351. To permit such movement to be accomplished the carrier must be actuated from a source or sources of power external to the work and must be supported so that the cutter may have such bodily movement. To that end it must be supported at two points, one of the supports being an actuator of such a character as to impart to the carrier and to the spindle the desired movement of oscillation while the other of the supports need not be in all cases an actuator but must be a support which is movable, as by being pivotally mounted at a point which might be fixed or movable, so as to accommodate the oscillatory movement of the carrier and the spindle. In the embodiment of the invention illustrated both supports are of the same character and are both actuators in the sense that they serve to effect the desired oscillatory movement of the carrier and are so positioned as to cause the milling cutter to have such movement as is necessary to form a curved groove or race in the face of the work such as that represented in the figures of the drawings. As thus represented the carrier $b$ has two studs $b^1$, $b^2$ which are received in eccentric bearings formed in trunnions $c^1$, $c^2$, at different distances from the work center. These trunnions are received and capable of oscillation in bearings formed at $d^1$ and $d^2$ in a fixed frame member $d$. Each trunnion has formed therewith or secured thereto an arm $c^3$, $c^4$ and each arm is pivotally engaged by a link $e^1$, $e^2$ respectively, both links being pivotally engaged at their other ends with an arm $f$ which is reciprocated bodily. It will be observed that the bodily movement imparted to the cutter by this mechanism is the resultant, not of an oscillation of the carrier about a single fixed pivot point, but of the movement of the carrier on two separated points one at least of which is itself moved bodily. In the embodiment of the invention illustrated reciprocation of the arm $f$ is effected by means now to be described. The arm $f$ forms a part of a sleeve $f^1$ which is mounted for vertical reciprocation on a tubular boss $g$ which is slotted, as at $g^1$, to permit vertical movement of a pin $h$ engaged, with the tubular boss $g$, by one end of a connecting rod $h^1$, the other end of which is engaged by a crank pin $k$ carried by a disc $k^1$ on a shaft $k^2$ which may be rotated by any suitable means, as by means of a worm wheel $k^3$ and a driving worm $k^4$.

The part to be operated upon, shown at $m$, as one member of a universal joint, is held in fixed position while it is being operated upon. In the construction shown it is clamped as at $n$ to a holder $n^1$ secured in a member $n^2$ of the frame. The holder is shown, for purposes of adjustment, as threaded at its upper end and engaged by a nut $n^3$ and the frame member $n^2$ is shown as split and provided with a clamping bolt, as at $n^4$, so that the holder and part operated upon may be held firmly in position during operation. To permit ready removal of the part operated upon when the milling operation has been completed and the clamping screw $n^4$ released the holder $n^2$ is shown as connected by a link $o$ with a handled lever $o^1$.

While the working parts of the machine shown in the drawings have been so designed as to enable curved grooves or races of the form shown to be milled out it will be understood that grooves of other forms may be milled by variations, as in the eccentricity of one stud or the other or both, with respect to the parts, such as the trunnions, in which they are received and that, while for the formation of grooves of the form shown oscillatory movement is imparted to the carrier and therefore to the milling spindle at two points of its length, a groove of another form may be milled by imparting oscillatory movement to the carrier at one point only and by supporting the carrier at another point by a means which permits free movement of the carrier under the influence of the oscillating means, without imparting to the carrier at another point the same degree of oscillation as that produced by either of the oscillating devices or in fact any degree. It will be understood also that while the positioning of the oscillating devices, that is, the trunnions, should be such as that shown for the milling of such a curved groove or race as that shown, the milling of a groove of a different form might be accomplished by a machine in which the oscillating devices are differently positioned.

It will be understood further that in the embodiment of the invention illustrated the oscillatory movement of the trunnions is accomplished through connection of their respective crank arms by links to the straight line reciprocating member $f$. Obviously, also, the crank pin $k$, connecting rod $h^1$ and cross pin $h$ constitute merely a convenient means for effecting straight line reciprocation of the arm or member $f$, and it will be understood that the milling of a complete groove is accomplished during a half revolution of the crank pin $k$ and that during the second half revolution the milling cutter is withdrawn from the groove already formed. In Figure 1 of the drawings the movement of the milling cutter from its initial position shown by a broken line in Figure 1 to the position shown by dot and dash lines in Figure 3 is accomplished by movement of the crank arm $c^3$ through 58°, while the further movement of the milling cutter necessary to complete the groove shown is accomplished during the further movement of the crank arm $c^3$ through 12°.

While the substance of the invention is embodied in a single milling cutter, as shown in Figures 1, 2 and 3, the milling of the four plane surfaces of one member of a universal joint, such as that shown and described in the Letters Patent above mentioned, can be accomplished at one time, such member to be milled being supported by the frame head $n^2$ and the several sets of trunnions being oscillated through link connections with the common vertical reciprocating member $f$. It will be understood that the angular displacement of the spindle with reference to the carrier is necessary for the adaptation of the several spindles of a multi-spindle machine. It is so illustrated in the case of a single milling spindle, as in Figure 2, but it will be obvious that in a machine embodying only one milling spindle, such spindle might be placed parallel with the carrier.

Various changes in details of construction and arrangement can be made to suit different conditions of use and, except as pointed out in the accompanying claims, the invention is not restricted to the particular construction and arrangement of parts shown and described herein.

I claim as my invention:

1. In a milling machine, the combination of a milling spindle, means to rotate the spindle, a carrier for the spindle, a bodily movable support on which the carrier is free to oscillate, means to actuate the support, and means to support the carrier at another point with freedom to oscillate on the first named support.

2. In a milling machine, the combination of a milling spindle, a carrier for the spindle, a spindle motor mounted on the carrier, a bodily movable support on which the carrier is free to oscillate, means to actuate the support, and means to support the carrier at another point with freedom to oscillate on the first named support.

3. In a milling machine, the combination of a milling spindle, means to rotate the spindle, a carrier for the spindle having two studs at separated points in the length of the carrier, trunnions eccentrically engaged with the studs respectively, and means to oscillate the trunnions.

4. In a milling machine, the combination of a milling spindle, means to rotate the spindle, a carrier for the spindle having a stud, a trunnion eccentrically engaged with the stud and having a crank arm, other means to support the carrier with freedom for oscillatory movement, a reciprocating member operatively connected with the crank arm of the trunnion, and means to reciprocate said member.

5. In a milling machine, the combination of a plurality of milling spindles, means to rotate the spindles, a plurality of independent carriers for the respective spindles, each carrier having two studs, trunnions eccentrically engaged with the respective studs of each carrier, and a common means to oscillate the trunnions.

6. In a milling machine, the combination of a plurality of milling spindles, means to rotate the spindles, a plurality of independent carriers for the respective spindles, each carrier having two studs, trunnions eccentrically engaged with the respective studs of each carrier, a common reciprocating member, and link connections from said member to the several trunnions.

CARL W. WEISS.